US012613936B2

(12) United States Patent
Bar-On et al.

(10) Patent No.: US 12,613,936 B2
(45) Date of Patent: Apr. 28, 2026

(54) EFFICIENT PIECEWISE POLYNOMIAL APPROXIMATORS

(71) Applicant: MELLANOX TECHNOLOGIES, LTD., Yokneam (IL)

(72) Inventors: Tomer Bar-On, Haifa (IL); Noam Dor Korem, Tal-El (IL); Gal Yefet, Haifa (IL); Benjamin Fuhrer, Tel-Aviv (IL)

(73) Assignee: Mellanox Technologies, Ltd., Yokneam (IL)

( * ) Notice: Subject to any disclaimer, the term of this patent is extended or adjusted under 35 U.S.C. 154(b) by 1139 days.

(21) Appl. No.: 17/577,059

(22) Filed: Jan. 17, 2022

(65) Prior Publication Data

US 2023/0229732 A1 Jul. 20, 2023

(51) Int. Cl.
*G06F 17/17* (2006.01)
*G06F 7/544* (2006.01)

(52) U.S. Cl.
CPC .............. *G06F 17/17* (2013.01); *G06F 7/544* (2013.01)

(58) Field of Classification Search
CPC . G06F 17/10; G06F 17/17; G06F 1/03; G06F 7/544; G06F 7/548; G06F 7/552; G06F 7/5525; G06F 7/556
See application file for complete search history.

(56) References Cited

U.S. PATENT DOCUMENTS

| | | | | |
|---|---|---|---|---|
| 6,809,740 | B1 * | 10/2004 | Weed | G06F 17/17 |
| | | | | 345/592 |
| 2003/0236675 | A1 * | 12/2003 | Duan | G06F 17/17 |
| | | | | 704/500 |
| 2014/0297606 | A1 * | 10/2014 | Li | G06F 16/283 |
| | | | | 707/693 |
| 2017/0004111 | A1 * | 1/2017 | Ng | G06F 7/544 |
| 2018/0018146 | A1 * | 1/2018 | Ebergen | G06F 1/0356 |
| 2019/0384575 | A1 * | 12/2019 | Hickmann | G06F 1/03 |

OTHER PUBLICATIONS

S.M.H. Ho et al., NnCore: A Parameterized Non-Linear Function Generator for Machine Learning Applications in FPGAs, IEEE 2017 (Year: 2017).*

(Continued)

*Primary Examiner* — Emily E Larocque
(74) *Attorney, Agent, or Firm* — Meitar Patents Ltd.; Daniel Kligler

(57) ABSTRACT
A method for approximating a mathematical function defined over a range includes initially dividing at least part of the range into a set of segments. For at least a subset of the segments, the mathematical function is approximated within each segment by a respective approximation polynomial. A series of one or more segment-merging iterations is performed, a given iteration including: selecting adjacent segments as candidates for merging; approximating the mathematical function by a candidate approximation polynomial, over at least a merged segment formed by merging the adjacent segments; and, if approximation of the mathematical function meets a specified condition, updating the set of segments by (i) replacing the adjacent segments with the merged segment and (ii) replacing the approximation polynomials of the adjacent segments with the candidate approximation polynomial.

11 Claims, 6 Drawing Sheets

(56) References Cited

OTHER PUBLICATIONS

Hall et al., "Optimal Error Bounds for Cubic Spline Interpolation," Journal of Approximation Theory, vol. 16, pp. 105-122, year 1976.

Abdessalam et al., "A New PWL Approximation for the 'Self-Adjustable Offset Min-Sum' Decoding with a Highly Reduced-Complexity," International Journal of Computer Applications, vol. 61, No. 19, pp. 1-6, Jan. 2013.

Saranya et al., "Implementation of PWL and LUT based Approximation for Hyperbolic Tangent Activation Function in VLSI," Proceedings of the International Conference on Communication and Signal Processing, pp. 1778-1782, year 2014.

Mahesh, "Comparative Analysis of Polynomial and Rational Approximations of Hyperbolic Tangent Function for VLSI Implementation," arXiv:2007.11976v2, pp. 1-13, Sep. 24, 2020.

Frenzen et al., "On the Number of Segments Needed in a Piecewise Linear Approximation," Journal of Computational and Applied Mathematics, vol. 234, pp. 437-446, year 2010.

Imamoto et al., "Optimal Piecewise Linear Approximation of Convex Functions", Proceedings of the World Congress on Engineering and Computer Science 2008 (WCECS 2008), pp. 1-4, Oct. 22-24, 2008.

Sasao et al., Numerical Function Generators using LUT Cascades, IEEE Transactions on Computers, vol. 56, No. 6, pp. 826-838, Jun. 2007.

* cited by examiner

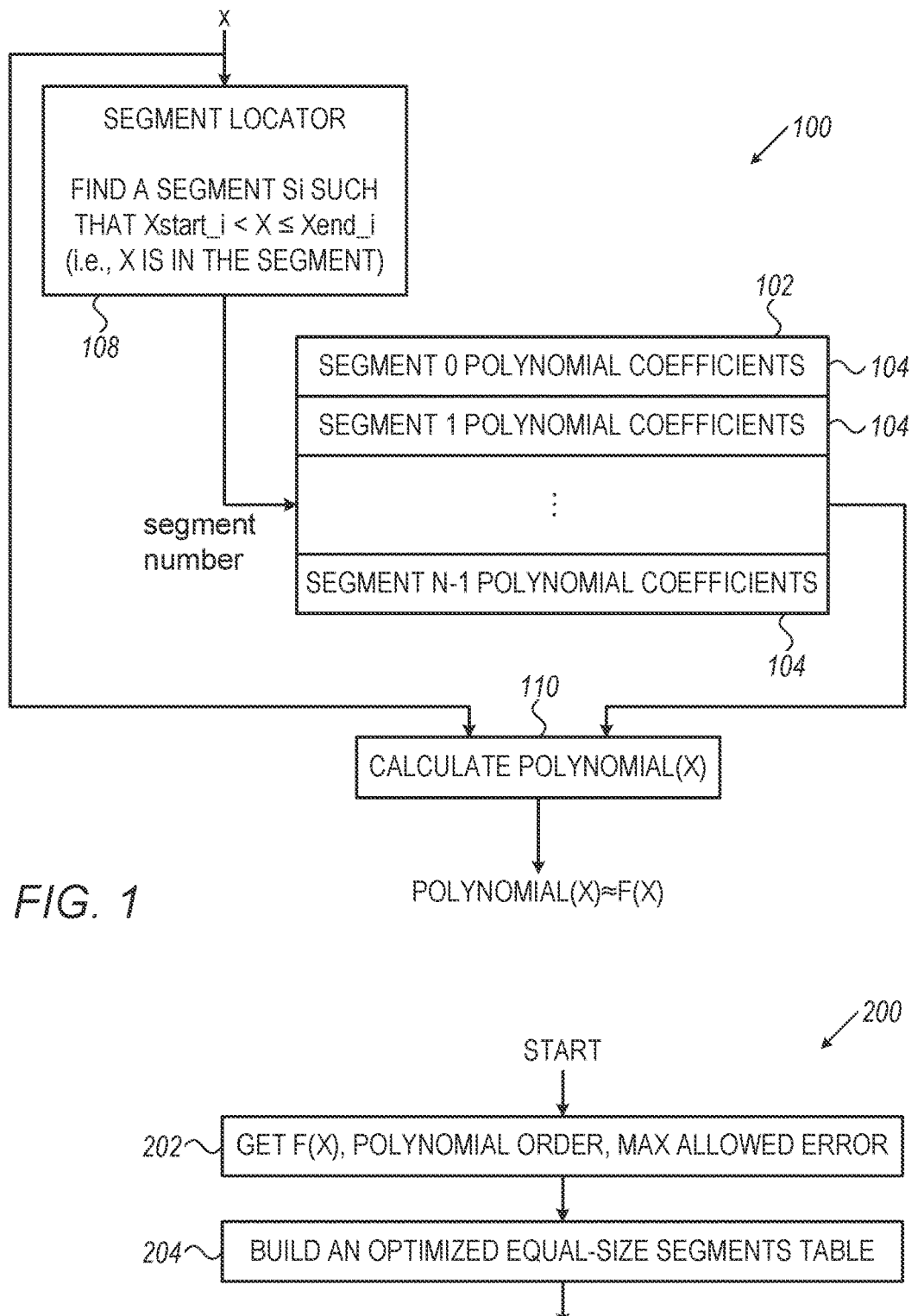

X

SEGMENT LOCATOR

FIND A SEGMENT Si SUCH THAT Xstart_i < X ≤ Xend_i (i.e., X IS IN THE SEGMENT)

108

100

102

SEGMENT 0 POLYNOMIAL COEFFICIENTS — 104

SEGMENT 1 POLYNOMIAL COEFFICIENTS — 104

⋮

SEGMENT N-1 POLYNOMIAL COEFFICIENTS

104 segment number

110

CALCULATE POLYNOMIAL(X)

POLYNOMIAL(X)≈F(X)

START

202 — GET F(X), POLYNOMIAL ORDER, MAX ALLOWED ERROR

204 — BUILD AN OPTIMIZED EQUAL-SIZE SEGMENTS TABLE

206 — MERGE SEGMENTS TO GET AN OPTIMIZED TABLE WITH VARYING SEGMENT SIZES

END

*FIG. 2*

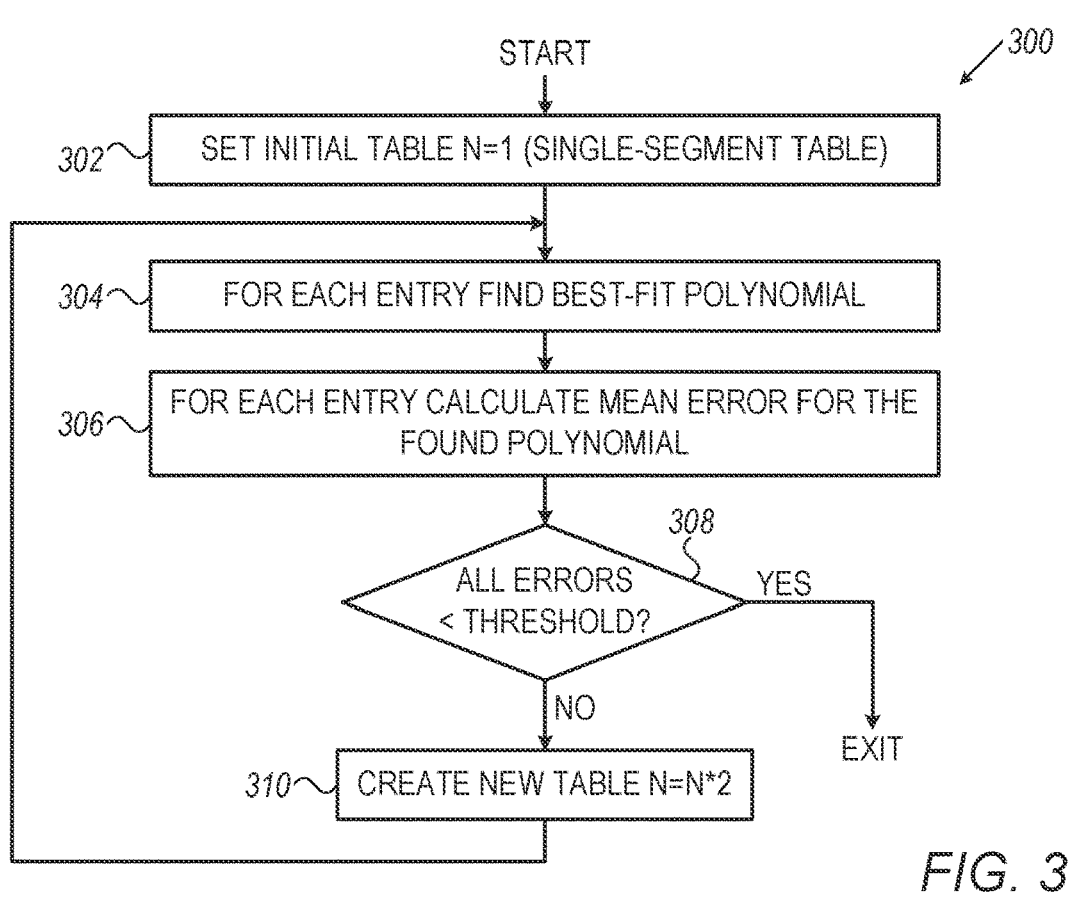
START
302 — SET INITIAL TABLE N=1 (SINGLE-SEGMENT TABLE)
304 — FOR EACH ENTRY FIND BEST-FIT POLYNOMIAL
306 — FOR EACH ENTRY CALCULATE MEAN ERROR FOR THE FOUND POLYNOMIAL
308 — ALL ERRORS < THRESHOLD?
YES → EXIT
NO
310 — CREATE NEW TABLE N=N*2
FIG. 3
FIG. 4A
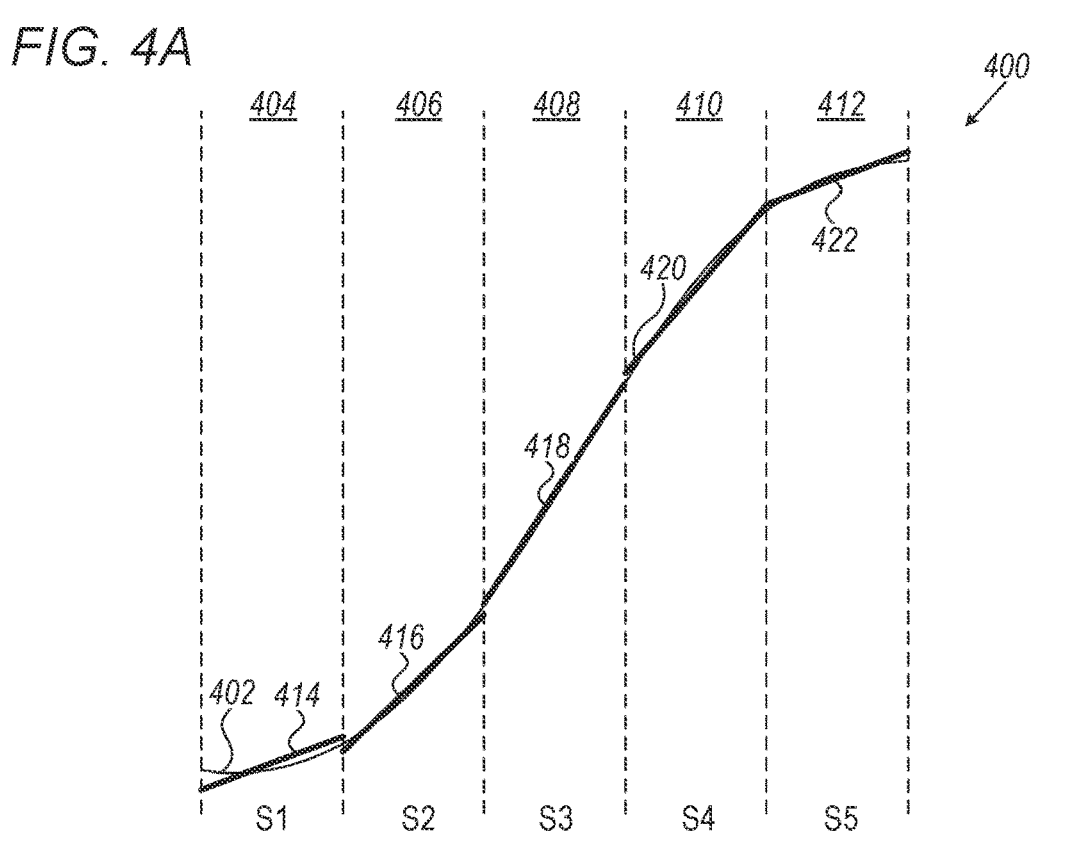
404 406 408 410 412
400
422
420
418
416
402 414
S1 S2 S3 S4 S5

*422*    *408*    *410*    *412*    *420*

*420*

*422*

AVERAGE ERROR
GREATER THAN
THRESHOLD.
-CANCEL MERGE

*418*

*424*

*402*

S12    S3    S4    S5

*404*    *432*    *410*    *412*    *430*

*420*

*422*

AVERAGE ERROR
LESS THAN
THRESHOLD.
- S23 REPLACES
S2 AND S3

*434*

*414*

*402*

S1    S23    S4    S5

EFFICIENT PIECEWISE POLYNOMIAL APPROXIMATORS

FIELD OF THE INVENTION

The present invention relates generally to VLSI design techniques, and particularly to methods for the design of piecewise polynomial approximators of mathematical functions.

BACKGROUND OF THE INVENTION piecewise approximation in general and, in particular, polynomial piecewise approximation using splines or using piecewise linear approximations, are commonly used VLSI design techniques.

In "Optimal Error Bounds for Cubic Spline Interpolation", Hall et al., JOURNAL OF APPROXIMATION THEORY 16 (1976), pages 105-122, the authors consider error bounds for a spline interpolation and then, by refinement and extension of an earlier analysis, obtain constants which are more widely applicable and smaller than heretofore known.

In "A New PWL Approximation for the 'Self-Adjustable Offset Min-Sum' Decoding with a highly Reduced-Complexity", Abdessalam et al., International Journal of Computer Applications (0975-8887) Volume 61-No. 19, January 2013, the authors propose a new Piecewise Linear (PWL) function for the decoding of the Low-Density-Parity-Check (LDPC) code with the Self Adjustable Offset Min-Sum (SAOMS) algorithm.

Lastly, "Implementation of PWL and LUT based Approximation for Hyperbolic Tangent Activation Function in VLSI", Sanyara and Elango, International Conference on Communication and Signal Processing, Apr. 3-5, 2014, India, pages 1778-1782, the authors assert that hardware implementation of neural networks plays a major role in many applications. The major building blocks for implementation are adder, multiplier and nonlinear activation function. A major challenge is faced in the implementation of activation function. The authors propose an approximation.

SUMMARY OF THE INVENTION

An embodiment of the present invention that is described herein provides a method for approximating a mathematical function defined over a range. The method includes initially dividing at least part of the range into a set of segments. For at least a subset of the segments, the mathematical function is approximated within each segment by a respective approximation polynomial. A series of one or more segment-merging iterations is performed, a given iteration including: selecting adjacent segments as candidates for merging; approximating the mathematical function by a candidate approximation polynomial, over at least a merged segment formed by merging the adjacent segments; and, f approximation of the mathematical function meets a specified condition, updating the set of segments by (i) replacing the adjacent segments with the merged segment and (ii) replacing the approximation polynomials of the adjacent segments with the candidate approximation polynomial.

In some embodiments, the specified condition defines an accuracy for the approximation. In some embodiments, the method includes discarding the candidates if the approximation of the mathematical function over the merged segment does not meet the specified condition. In some embodiments the approximation polynomials are first degree polynomials.

In a disclosed embodiment, initially dividing the at least part of the range into the set of segments includes reducing a resolution with which boundaries of the segments are represented. In an example embodiment, performing the segment-merging iterations includes reducing a resolution with which boundaries of the segments are represented.

In some embodiments, the given iteration further includes setting a corresponding bit in a mask bitmap. In an embodiment, setting the corresponding bit in the mask bitmap includes setting the bit responsively to the approximation of the mathematical function over the merged segment meeting a specified accuracy.

In an embodiment, approximating the mathematical function includes constraining the approximation to be continuous across a boundary between the adjacent segments. In an embodiment, approximating the mathematical function includes constraining the approximation to be monotonous across a boundary between the adjacent segments. In an embodiment, updating the set of segments further includes updating the approximation polynomials of one or more segments that neighbor the merged segment.

There is additionally provided, in accordance with an embodiment that is described herein, a system for approximating a mathematical function defined over a range. The system includes a processor and a memory. The processor is to initially divide at least part of the range into a set of segments, to approximate, for at least a subset of the segments, the mathematical function within each segment by a respective approximation polynomial, and to perform a series of one or more segment-merging iterations, a given iteration including selecting adjacent segments as candidates for merging, approximating the mathematical function by a candidate approximation polynomial, over at least a merged segment formed by merging the adjacent segments, and, if approximation of the mathematical function meets a specified condition, updating the set of segments by (i) replacing the adjacent segments with the merged segment and (ii) replacing the approximation polynomials of the pair of adjacent segments with the candidate approximation polynomial. The memory is to store at least the approximation polynomials.

The present invention will be more fully understood from the following detailed description of the embodiments thereof, taken together with the drawings in which:

BRIEF DESCRIPTION OF THE DRAWINGS

FIG. 1 is a block diagram that schematically illustrates piecewise polynomial approximation circuitry, in accordance with an embodiment of the present invention;

FIG. 2 is a flowchart that schematically illustrates a method for segment partitioning in a piecewise polynomial approximator, in accordance with an embodiment of the present invention;

FIG. 3 is a flowchart that schematically illustrates a method to generate an equal-size-segments table, wherein the segment size is a power of 2, in accordance with an embodiment of the present invention;

FIGS. 4A-4E are graphical presentations that schematically illustrate stages of a segment merge algorithm, in accordance with an embodiment of the present invention;

DETAILED DESCRIPTION OF EMBODIMENTS

Overview

Figure 4B:
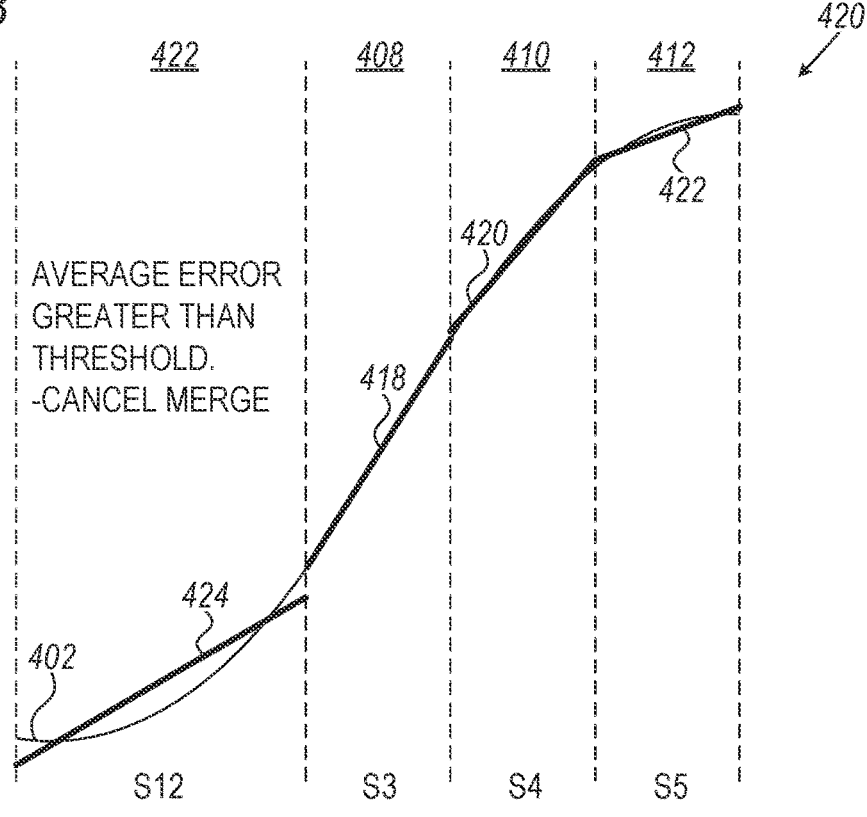

Calculation of various mathematical functions in integrated circuits may be done by processor cores. Some functions, however, are complex and take a relatively long time to calculate on a sequential execution processor; in some cases, specialized circuits can be added, which calculate a given function or a set of functions at higher speed, at the expense of higher power consumption and/or larger silicon area.

When the accuracy of the calculation can be traded-off for speed, a piecewise calculation circuit may be used, wherein the range of the function argument is divided to segments in which the calculation (or, an approximation of the calculation) can be done rapidly.

Piecewise polynomial (PWP) is a piecewise calculation technique wherein a relevant range of the function is divided into segments, and polynomials are used to approximate the function, using, in each segment, a set of polynomial coefficients that minimizes the approximation error in the segment. (Typically, a first-degree polynomial: $Y=R_1*x+R_0$, is used, and the approximation is referred to as piecewise linear (PWL).)

In general, when an n-order smooth function (i.e., a function that is differentiable in all orders up to the $n^{th}$ order), is approximated by an n-order polynomial, the approximation error can be arbitrarily reduced by decreasing the segment size and, hence, dividing the function into many small segments results in high accuracy approximation. However, to store the polynomial coefficients of many segments, a large memory is required, increasing the integrated circuit size, and possibly decreasing the calculation speed. We will refer hereinbelow to the argument of the approximated function as x. We will further refer to the approximated function as F(x).

For many of the approximated functions, the curvature of the function varies over the function range, and an uneven division into segments may be used, wherein a high curvature portion of the function range is divided into many small segments, and a low curvature portion is divided to a smaller number of larger segments. This manner of uneven division into segments is useful, for example, to reduce approximation error in high curvature regions while avoiding unnecessary memory usage in low curvature and small error regions. Thus, the size of the memory that stores the polynomial coefficients can be reduced. However, a more elaborate segment-locator circuit should typically be added, to translate the x value into a corresponding memory address.

Embodiments according to the present invention that are disclosed herein provide methods and systems to design PWP approximation circuits with a small number of segments and a simple segment locator. In some embodiments, a PWP construction algorithm comprises two phases. In a first phase, the algorithm finds an optimal division of the function range into equal-size segments; in a second phase, the algorithm finds an optimized division of the range into segments that are not necessarily equal in size.

In some embodiments, the first algorithm phase comprises starting with a single segment that covers the complete function range, and then executing segment-splitting iterations, each iteration comprising replacing every segment by two half-size segments; the iterations continue until reaching a division in which the maximum approximation error is below a (preset or adaptive) threshold. In an embodiment, the number of segments attained in the first algorithm phase is a power of two.

In embodiments, the second algorithm phase comprises starting with the segment with the lowest x value, merging a segment with the next (higher x) segment to generate a new segment, and, if the new segment meets a certain error criterion, replacing the segment and the neighbor segment with the merged segment; the algorithm thus continues, merging new and already merged segments with the next segments, until the last segment is reached.

In an embodiment, the second algorithm phase comprises starting with the smallest existing segment among all segments, attempting to merge it with a neighboring segment, given the new merged segment meets an error criterion. The algorithm thus continues to the next smallest segment possible, merging new and already merged segments with other segments. Merging segments in this order may reduce the width of the bit mask required in the segment locator circuit.

In another embodiment, a simple segment locator is generated by creating a mask-bitmap in which set bits correspond to merged segments; the mask bitmap can then be used to calculate, for every x value, a corresponding address in the coefficients-memory.

In yet another embodiment, a lookup table is prepared, translating the x value into a corresponding address in the coefficients-memory.

In some embodiments, a processor is configured to carry out the disclosed technique, so as to generate efficient PWP approximation circuits with a reduced coefficient table size and a simple segment locator, for a given function and a given error criterion.

INTRODUCTION

Piecewise linear (PWL) approximation or, more generally, piecewise polynomial (PWP) approximation is widely used in semiconductor devices to evaluate mathematical functions with arbitrary precision. A noteworthy example is the realization of hyperbolic-tangent activation functions in neural networks (see, for example, "Comparative Analysis of Polynomial and Rational Approximations of Hyperbolic Tangent Function for VLSI Implementation", Mahesh C, arXiv: 2007.11976v2 [cs.AR]).

For increased accuracy, the range of the function argument is typically divided to a large number of segments, each with its own set of polynomial coefficients. However, a large number of segments may be problematic—for fixed size segments, the memory required is typically large and, hence, expensive in both area and power consumption. If the sizes of the segments are not equal, the size of the memory may be reduced, but a more elaborate circuitry to find the segment in memory should be implemented, which may be complex and/or slow for a large number of segments.

Mathematical Definitions

A given function F(x), which should be approximated, is defined over a range of x values from $X_{start}$ to $X_{end}$. For piecewise approximation, the range is divided to contiguous segments Si, and a polynomial that best approximates F(x) is defined for each segment:

$$F(x) = \begin{cases} P_0(x) \text{ if } X_0 \le x < X_1 \\ \cdots \\ P_{n-1} \text{ if } X_{n-1} \le x < X_n \end{cases}$$

$P_0$ to $P_{n-1}$ are polynomials:

$$P_i(x) = \sum_{k=0}^{K} C_{i,k} * x^k$$

where K is the order of the polynomial, and $C_{i,k}$ is the $k^{th}$ coefficient of the polynomial defined for the $i^{th}$ segment.

In embodiments, the coefficients for each segment $S_i$ are defined to minimize an error measure of the approximation. For example, in an embodiment, the error measure may be defined as $$\text{Error} = \sum_{x=X_i+1}^{X_{i+1}} (F(x) - P(x))^2$$

In another example, the error measure is defined as:

$$\text{Error} = \sum_{x=X_i+1}^{X_{i+1}} |F(x) - P(x)|$$

The polynomial coefficients $C_i$ are the set of coefficients for which $\text{Error}_i$ is minimal.

In other embodiments, the error measure is the maximum error value for the segment, and in yet other embodiments the error measure is a weighted function that includes, for example, the average and the maximum error.

PWL Approximation

We will describe below an example in which a function y(x) is approximated by a first-degree polynomial (PWL). The approximation function, G(x), is defined as:

$$G(x) = \sum g_i(x)$$

where $g_i(x)$ is defined as:

$$g_i(x) = \begin{cases} c_{i,1}x + c_{i,0} & x \in [a_i, b_i] \\ 0 & \text{otherwise} \end{cases}$$

The vector $(a_0, b_0, a_1, b_1 \ldots b_n)$ is called the knot vector.

The PWL approximation is implemented by a segment locator, a look-up table (LUT) and a multiplier-accumulator (MAC). The algorithm attempts to minimize the combined area of the LUT and the segment locator size at a given maximum error measure.

In "On the number of segments needed in a piecewise linear approximation", Frenzen et al., Journal of Computational and Applied Mathematics 234 (2010) 437-446, the authors show that the accuracy of an optimal solution is $$N \sim \int_a^b \frac{|f''(x)|}{\sqrt{\epsilon}}$$

when y(x)=tanh(x), this can be simplified to $1/(\#bins)^2$.

It should be noted that tanh(x) is an important function that is often used as the activation function in machine learning applications. In embodiments, the tanh(x) activation function is efficiently approximated, with small error values.

System Description

FIG. 1 is a block diagram that schematically illustrates a piecewise polynomial circuitry 100, in accordance with an embodiment of the present invention. Piecewise polynomial circuitry 100 comprises a random-access-memory (RAM) 102 that is configured to store the polynomial coefficient of all segments (will be referred to below as segments-RAM, segments memory and, sometimes, segments table). In an embodiment, a single RAM address is allocated to each segment (e.g., segment 0 coefficients are stored in address 0, segment 1 coefficients are stored in address 1, etc.).

Piecewise polynomial circuitry 100 further comprises a segment-locator circuit 108 and a polynomial calculator 110. The segment-locator circuit receives an x input, and finds segment Si for which the x is larger than (or equal to) Si lower boundary, and smaller (or equal to) Si higher boundary. The Piecewise polynomial circuitry then reads RAM 102, at address=I, to get the polynomial coefficients $C_i$.

Polynomial calculator 110 then calculates P(x) at the selected segment, using coefficients $C_i$. Typically, polynomial calculator 110 comprises one or more multiply-accumulate (MAC) circuits.

When the number of segments is large, segment locator 108 may comprise many gates and/or take a long time to find the segment. In some embodiments, segment locator 108 comprises a single comparator and a binary search circuit; the segment locator then takes $\approx \log_2$ (number-of-segments) comparisons (typically one clock cycle per comparison), to locate the segment. In other embodiments, other structures may be used for segment locator 108. In all embodiments, however, the segment locator is large and/or slow for large number of segments (a segment locator circuit according to an example embodiment will be described below, with reference to FIG. 6).

Embodiments described hereinbelow provide for methods to generate a piecewise-polynomial circuit with a small-size RAM and, consequently, fast operation (including fast segment location and fast RAM access). We will refer hereinbelow to a software program that generates the piecewise polynomial circuit as a PWP-SW; in embodiments, PWP-SW may be written in any suitable programming language, e.g., C++. The PWP-SW may be, for example, embedded in an Electronic Design Automation (EDA) toolset or, for another example, may comprise a stand-alone program.

FIG. 2 is a flowchart 200 that schematically illustrates a method for segment partitioning in a piecewise polynomial approximator, in accordance with an embodiment of the present invention. The flowchart is executed by a PWP-SW.

The flowchart starts at a get-parameters step 202, wherein the PWP-SW gets the function to be approximated, the polynomial order to be used, and a maximum allowed error (for a given error estimation function).

Next, the flowchart enters a build-equal-segments-table step 204, and creates a table of coefficients, wherein all segments have an equal size (an example embodiment, to be described below, presents a method for building an optimized equal-sized-segments table, wherein the segment size is a power of two).

Lastly, the flowchart enters a merge-segments step 206, and merges segments according to a criterion, until the table is optimized (step 206 will be described in detail below).

FIG. 3 is a flowchart 300 that schematically illustrates a method to generate an equal-size-segments table, wherein the segment size is a power of two, in accordance with an embodiment of the present invention. The flowchart is executed by a PWP-SW. The range of the table is assumed to be a power of two.

The flowchart starts at a set-initial-table step 302, wherein the PWP-SW sets a segments-table size to 1 (a single-entry segments-table), to cover the full range of the function. (Typically, the error at this stage is unacceptably high.)

Next, at a find-best-fit step 304, the PWP-SW finds, for each segment, a best fit polynomial that minimizes an error measure of the function in the range covered by the segment. The PWP-SW registers the coefficients of the polynomials in the corresponding entry in the segments-table.

Next, at a calculate error step 306, the PWP-SW calculates the error for the selected polynomial, e.g., by summing the square of the differences between the polynomial and the function throughout the segment.

The PWP-SW then enters a check-error-size step 308 and checks if the largest error of all segments (calculated in step 306) is less than a (preset or adaptive) threshold. If all errors are less than the threshold, the flowchart ends. If, in step 308, at least one of the errors is not below the threshold, the flowchart, at a create-new-table step 310, creates a new segments-table, with N—the number of segments—multiplied by 2 (that is—each segment will turn to two segments). After step 310, the flowchart reenters step 304, to check if the current table meets the error requirement.

The flowchart illustrated in FIG. 3 and described hereinabove is cited by way of example. Other flowcharts may be used in alternative embodiments. For example, in some embodiments, step 304 comprises comparing the error to the threshold and, thus, the flowchart will enter step 310 on a first occurrence of a segment with an error not less than the threshold. In other embodiments, the flowchart starts with the largest possible table (e.g., segment size equals 1), and then reduces the size if error conditions are met. In other embodiments, the flowchart starts at a given power-of-two segment size, and then increases or decreases the segment size according to the error measure. In an embodiment, the criteria for measuring the error and comparing it to a threshold may be different, e.g., a comparison of the average error rather than the largest error. In an embodiment, in step 310, the PWP-SW may multiply N by an integer power of two that is not necessarily 1 (for example, a power that is derived from the ratio between the maximum error and the threshold), and in yet other embodiments the PWP-SW multiplies N, in step 310, by an integer that is not necessarily a power of two.

We will now proceed to describe a method for segment merging (e.g., step 206, FIG. 2). In an embodiment, adjacent segments are merged; a parameter set for the merged segment is calculated, and an error measure of the merged segment is compared to a (preset or adaptive) threshold. If the error is too large, the merge is abandoned. If the error is less than the threshold, further merges of the merged segment with a next adjacent segment will be attempted. The description below includes a simplified example (FIGS. 4A to 4E), and a flowchart (FIG. 5).

For simplicity, we will mainly describe hereinbelow (with reference to FIGS. 4A through 4E) first order polynomial approximation $F(x)=R_1*x+R_0$, also called piecewise linear (PWL) approximation; the disclosed techniques, however, can be used in any order piecewise polynomial (or non-polynomial) approximations.

FIG. 4A is a graphical presentation that schematically illustrates an initial step 400 of segment merge algorithm, in accordance with an embodiment of the present invention. A function F(x) 402 is defined in a range that is divided to five equal-length segments: a segment S1 404, a segment S2 406, a segment S3 408, a segment S4 410 and a segment S5 412. In each segment, function 402 is approximated by a linear function (e.g., a straight line)—a line 414 in S1, a line 416 in S2, a line 418 in S3, a line 420 in S4 and a line 422 in S5 (note that in segment S3, the curvature of function 402 low and, is hence, line 418 is indistinguishable from function 402).

Figure 5:
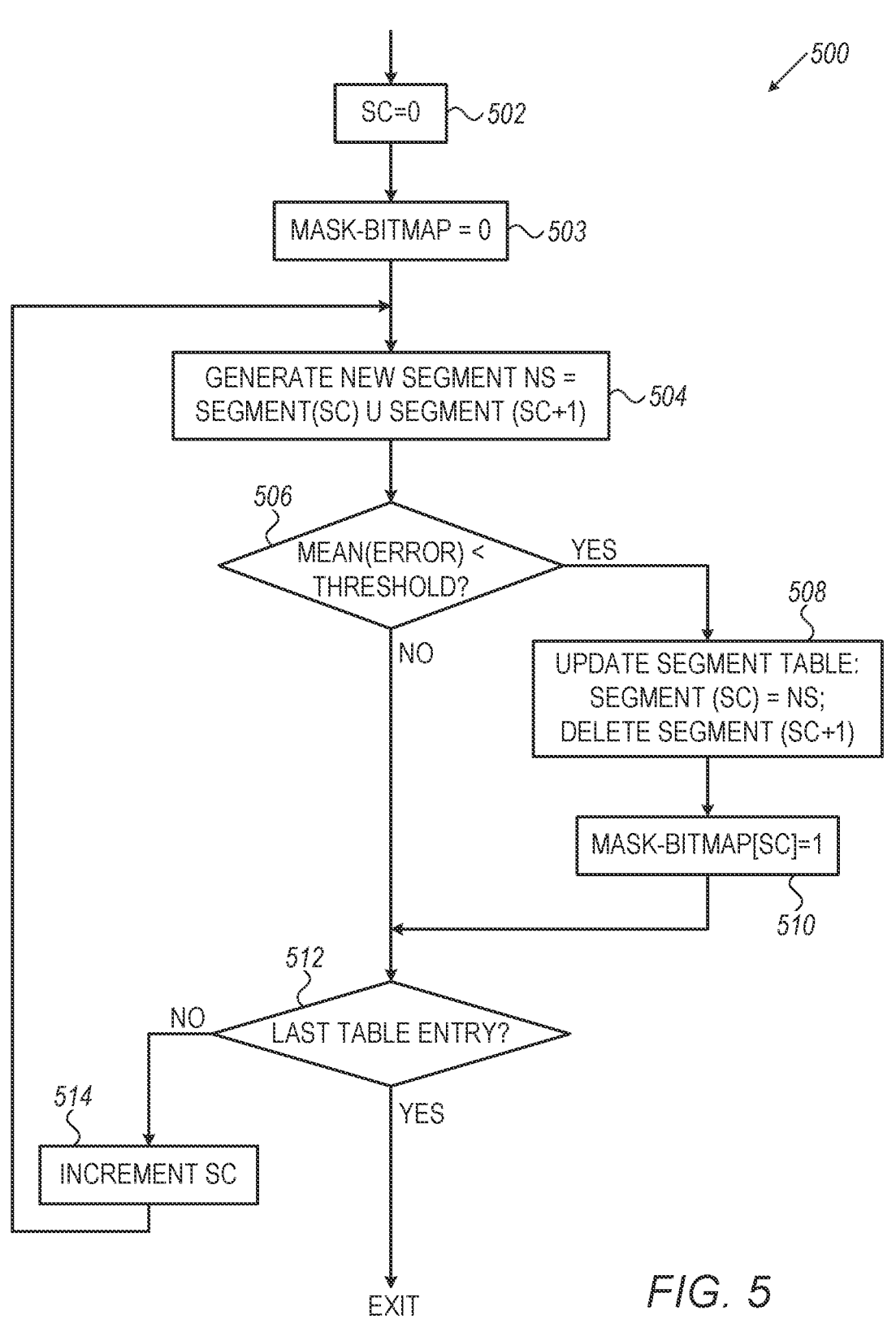
FIG. 5 is a flowchart that schematically illustrates a method for segment merging, in accordance with an embodiment of the present invention.

FIG. 4B is a graphical presentation that schematically illustrates a first merge step 420 of segment merge algorithm, in accordance with an embodiment of the present invention. Segments S1 and S2 of FIG. 4A are now merged to a segment S12 422, and a new linear function 424 is calculated, which best approximates F(x) in the merged segment S12. According to the example embodiment illustrated in FIG. 4B, the error on segment S12 is too large (e.g., above a threshold), and the merging is abandoned.

Figure 4C:
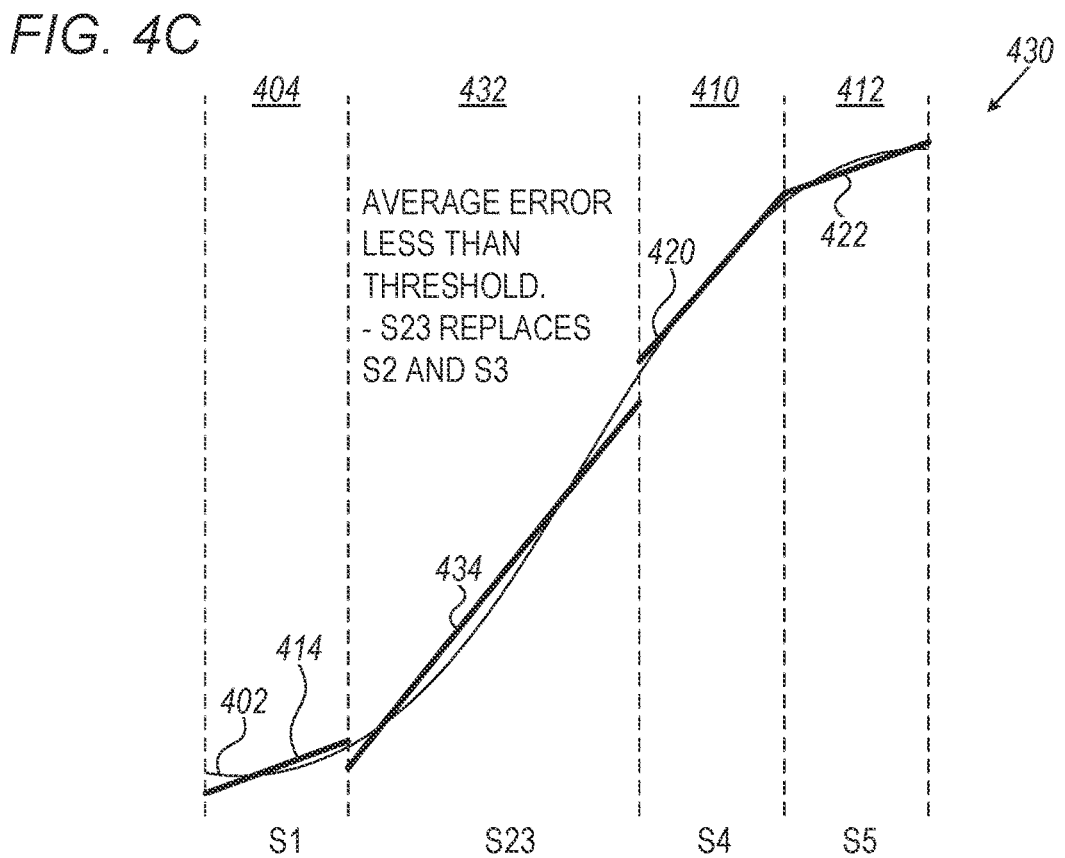

FIG. 4C is a graphical presentation that schematically illustrates a second merge step 430 of segment merge algorithm, in accordance with an embodiment of the present invention. Segments S2 and S3 are now merged, to form a segment S23 432. A new linear function 434 is calculated, which best approximates F(x) in the merged segment S23. According to the example embodiment illustrated in FIG. 4C, the error in the merged segment S23 is below a threshold, and the merge is good. The new table 102 (FIG. 1) will have S23 instead of S2 and S3.

Figures 4D, 4E:
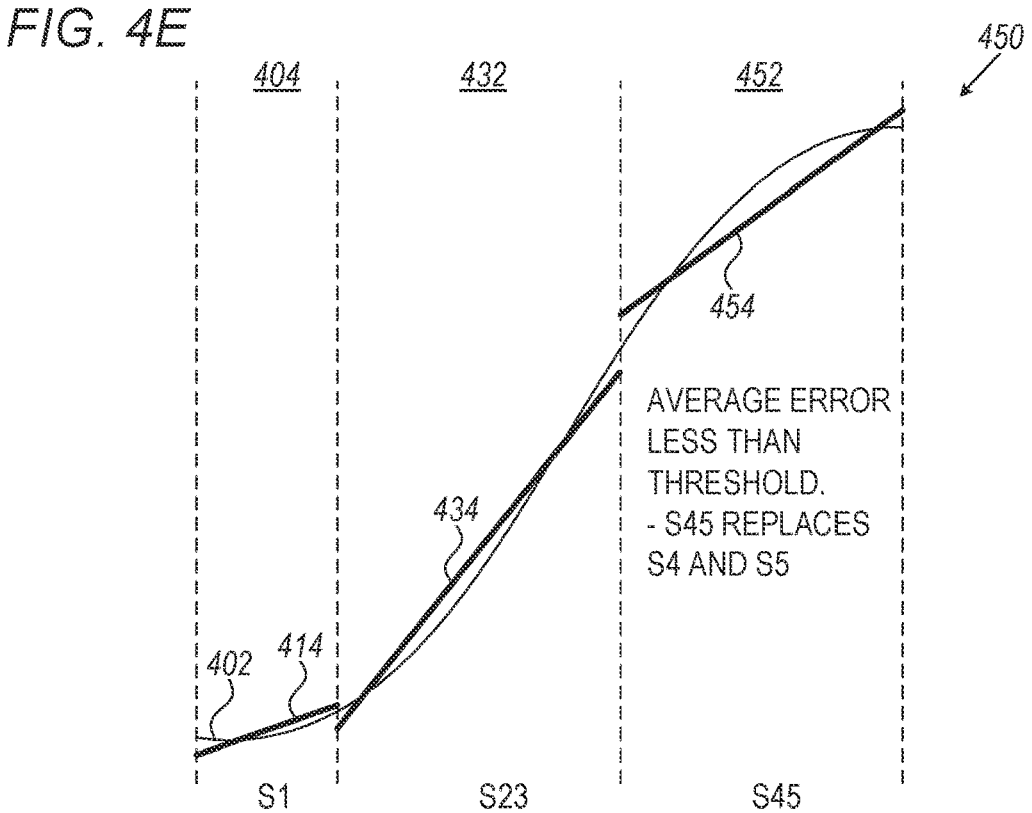

FIG. 4D is a graphical presentation that schematically illustrates a third merge step 440 of segment merge algorithm, in accordance with an embodiment of the present invention. The segment-merge algorithm now merges segment S23 with segment S4, to get a segment S234 442, and then calculates a linear function 444, to best fit function 402 in the merged segment. According to the example embodiment illustrated in FIG. 4D, the error is now too large (e.g., above the threshold), and the merge is abandoned.

FIG. 4E is a graphical presentation that schematically illustrates a fourth merge step 450 of segment merge algorithm, in accordance with an embodiment of the present invention. The segment-merge algorithm now merges segment S4 with segment S5, to get a segment S45 452, and then calculates a linear function 454, to best fit function 402 in the merged segment. According to the example embodiment illustrated in FIG. 4E, the error in the merged segment S45 is below the threshold, and the merge is good. The new table 102 (FIG. 1) will have S45 replacing S4 and S5.

The segment merge algorithm is now complete, and the new table includes segment S1, S23 and S45.

The segment merge algorithm illustrated in FIGS. 4A through 4E is a simplified example that is cited for conceptual clarity. Other algorithms may be used in alternative embodiments. For example, any suitable number of segments may be used for the initial division (not necessarily 5). In some embodiments, the algorithm may vary, e.g., after a successful merging of S1 with S2, the algorithm may try to merge S2 with S3, and may prefer this latter merge if the error is smaller. In other embodiments, the algorithm may be divided to stages, merging initial segments, and then merging pairs of merged segments, and so on. In other embodiments, the order by which segments are merged will start from the smallest size segments, to avoid end-state segment maps which contain very large together with very small segments.

As seen in the example of FIGS. 4A-4E, the approximation function F(x) is not always continuous at the segment boundaries. In some embodiments, the approximation function F(x) is required to be continuous; mathematically, for each segment boundary $a_i$, the left-side limit and right-side limits of F(x) are constrained to be the same:

$$\lim_{x \to A_i^+} F(x) = \lim_{x \to A_i^-} F(x)$$

In embodiments, the PWP SW, after merging segments $S_i$ and $S_{i+1}$, optimizes the values of adjacent segments $S_{i-1}$ and $S_{i+2}$, (the segments to the right and left of the segments being merged) to maintain a continuity and to obtain the smallest approximation error. Embodiments using this approach would require calculating the updated error value not only for the new, merged segment $S_{[i,i+1]}$, but also to take into account the updated error in the adjacent segments, $S_{i-1}$ and $S_{i+2}$.

In other embodiments, the PWP SW sets a more relaxed requirement for the segment boundaries. Rather than constraining the approximation function F(x) to be continuous across a segment boundary, the PWP SW may require that the approximation function F(x) be merely monotonous (monotonically increasing or monotonously decreasing) across a segment boundary.

FIG. 5 is a flowchart 500 that schematically illustrates a method for segment merging, in accordance with an embodiment of the present invention. The flowchart is executed by a PWP-SW (as defined above). According to the example embodiment illustrated in FIG. 5, the PWP-SW generates, while merging the segments, a mask bitmap, to be used for the generation of a segment locator 108 (FIG. 1).

According to the example embodiment illustrated in FIG. 5, the error measure used by the PWP-SW is the average of the error over a given segment. Other suitable measures, such as average square-error, maximum absolute error, and others, may be used in alternative embodiments.

The flowchart starts at a set-initial-segment step 502, wherein the PWP-SW sets a segment-counter variable SC to 0, to point at a first segment in a segment table (e.g., stored in segments-RAM 102, FIG. 1) (We will refer hereinbelow to a segment pointed to by a pointer ptr as segment (ptr)).

Next, at a set-mask-bitmap-0, the PWP-SW clears the value of a mask bitmap register to all-0 (the number of bits in the mask bitmap register equals to the current number of segments).

Next, at a generate-new-segment step 504, the PWP-SW generates a new (temporary) segment NS by merging segment (SC) with segment (SC+1) and finding the coefficients of a best fitting polynomial (e.g., a polynomial with the smallest average error) over the merged segment NS.

The PWP-SW then, in a check-mean-error step 506, will check if the error measure pertaining to NS is below a threshold. If so, the merge is deemed successful—the PWP-SW, in an update-table step 508, will replace segment (SC) with segment NS, and delete segment (SC+1) and then, in an update mask bitmap 510, set bit SC of the mask bitmap register. Next, the PWP-SW will enter a check-last step 512.

(If, in step 506, the error is not below the threshold, the PWP-SW will enter check-last step 512 directly.)

In check-last step 512, the PWP-SW checks if SC points to the last segment in the segment table. If so, the flowchart ends, and the segment table contains the optimized segments (that is—optimized segment boundaries and the polynomial parameters for each segment). If, in step 512, SC does not point to the last segment, the PWP-SW, in an increment-SC step 514, will increment SC and then reenter step 504, to merge the next pair of segments.

Thus, according to the example embodiment illustrated in FIG. 5, a PWP-SW can generate a segments-table by methodically merging neighboring PWP segments, checking the error in the merged pairs and reverting the merge if the error does not meet a threshold. At the same time, the PWP-SW generates a mask bitmap, to be used for the generation of a segment locator for the generated table.

The flowchart illustrated in FIG. 5 and described hereinabove is an example that is cited for conceptual clarity. Other suitable flowchart may be used in alternative embodiments. For example, in some embodiments, the flowchart comprises loops, wherein in each loop the PWP-SW tries all possible merges of neighbor segments and selects the one with the least error. In embodiments, various suitable error measures may be used. As another example, merging can be applied simultaneously (in the same iteration) to more than two adjacent segments.

We now proceed to describe how the mask bitmap that is generated in flowchart 500 (FIG. 5) can be used to implement segment locator 108 (FIG. 1) in an integrated circuit.

Figures 6, 7:
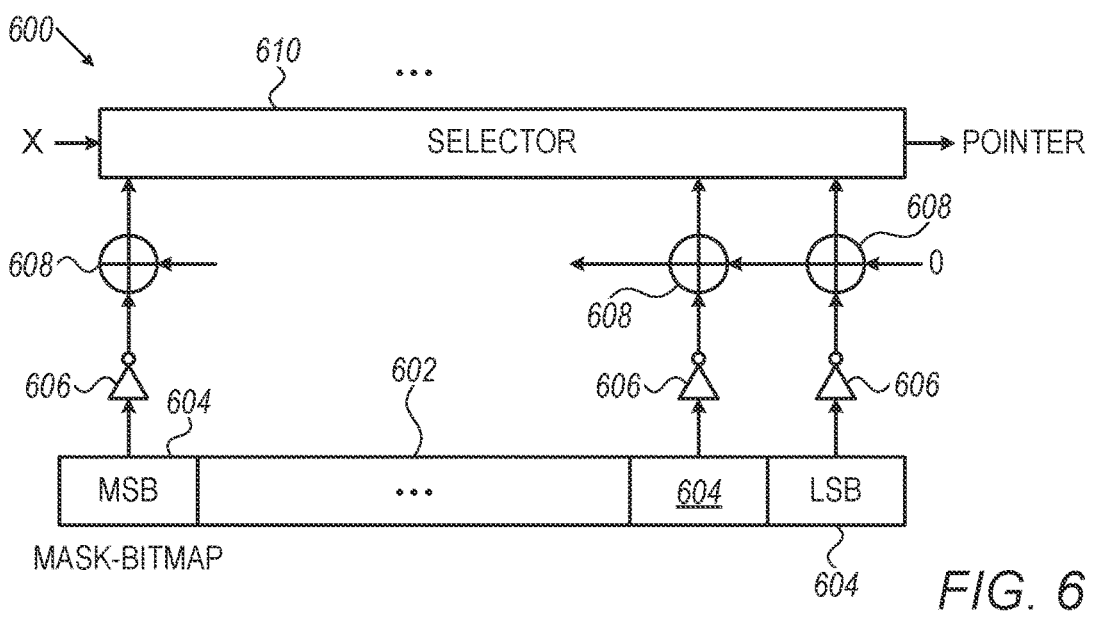
FIG. 6 is a block diagram that schematically illustrates a segment locator circuit, in accordance with an embodiment of the present invention.
FIG. 7 is a block diagram that schematically illustrates a system for finding an optimal piecewise polynomial for a given function F(x), in accordance with an embodiment of the present invention.

FIG. 6 is a block diagram that schematically illustrates a segment locator circuit 108, in accordance with an embodiment of the present invention. The segment locator comprises a mask bitmap 602, in which set bits 604 indicate that the corresponding segments are merged. For example, if segment 3 is merged with segment 4, bit 3 of mask bitmap 602 will be set.

We assume that for the purpose of segment location, an x_clip is used rather than x, by purging least significant bits of x. For example, consider a case of x dynamic range of 24 bits, with a Equal-size segment table of 8 bits. The segment locator circuit can use the 8 MSB bits of X. Note that in this case the segment locator circuit (108), coefficient extraction (102) and the subsequent polynomial approximation stage (110) will use x_clip rather than x:

x_clip$_{8bit}$=x$_{24bit}$ [23:16]
Segment Locator (108, FIG. 1):
segment_id=segment_locator(x_clip$_{8bit}$)
Coefficient Extractor 102:
[$C_1$, $C_0$]=LUT[segment_id]
Calculate Polynomial 110 (FIG. 1)L $$F\_x = C_1 * X_{24bit} + C_0 \qquad //110$$

If none of the segment pairs were merged, all bits 604 of the mask bitmap are cleared, and, hence, x_clip points directly to the corresponding entry in the segments RAM. when two segments are merged, two x_clip values will point to the same segment.

According to the example embodiment illustrated in FIG. 6, bits 604 of mask bitmap 602 are first inverted by a set of inverters 606, and then added by a set of cascaded adders 608. The output of the n$^{th}$ adder 608 will represent the address of the segment in the segments RAM that corresponds to x=n.

A selector 610, receiving x as an input, sets a pointer output equal to the output of the x$^{th}$ adder. The pointer is used as an address to the segments RAM.

The structure of segment locator 108 illustrated in FIG. 6 and described hereinabove is cited by way of example. Other structures may be used in alternative embodiments. For example, in an embodiment, mask bitmap 602 may store inverted mask bits and, hence, inverters 608 are not used; in another embodiment adders 608 add a complement of bits 604 and, again, inverters 606 are not needed. In some embodiments, segment locator 108 comprises a lookup table. In other embodiments, a single adder is used, with sequential logic (and, hence, calculating the pointer may take longer). In yet other embodiments, segment locator 108 comprises a set of comparators that compare the x value to the borders between the segments, and an encoder that translates the comparators outputs to an address in the coefficients-RAM.

FIG. 7 is a block diagram that schematically illustrates a system 700 for finding an optimal piecewise polynomial for a given function F(x), in accordance with an embodiment of the present invention. A user 702 (typically a design engineer), using a terminal 704 (the terminal comprising, for example, a screen, a keyboard, and a mouse), communicates with s computer system 706. The computer system comprises a processor 708 and a computer memory 710.

Computer memory 710 stores, at a given time, various code and data segments, including a graphic-user-interface (GUI) 712, which is used by the user to operate the software and to monitor the results; a polynomial coefficients table 714, which stores the coefficients of the piecewise polynomial (similar in contents to table 102 (FIG. 1)); an equal-segment-table build program 716, which builds an optimized equal-size table (e.g., flow 300, FIG. 3); a segment-merge program 718 (e.g., step 504 of flowchart 500 function (FIG. 5)); a find-best-fit 720, which is configured to find the polynomial with smallest error (e.g., step 304 of flowchart 300 (FIG. 3)); and an error measure function 722 (e.g., step 306 of flowchart 300).

The user enters the function F(x), the allowed error measure and the degree of the polynomial, through the GUI, and then activates the optimized equal-size table-build program 714, to generate a table with the lowest number of segments that is a power of 2.

For further optimization, the user may activate segment-merge program 718, which merges segments to generate a reduced number-of-segment piecewise polynomial representation of F(x), and to generate a pointer calculating circuit (e.g., circuit 600, FIG. 6). Both equal-size table-build program segment-merge program 718 call functions find-best-fit 720 and error-measure 710, to find a best fitting polynomial and to measure the error, respectively.

In various configurations, computer system 706 may comprise one or more programmable processors 708, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

The configuration of PWP circuit 100, including coefficients memory 102 and segment locator 108; the method of building an equal size segments table 300, the method of segment-merging 500 and the configuration of computer system 700, are example configurations and methods that are shown purely by way of illustration. Any other suitable configurations and methods can be used in alternative embodiments.

In various embodiments, the different elements of PWP circuit 100, may be implemented using suitable hardware, such as one or more Application-Specific Integrated Circuits (ASIC) or Field-Programmable Gate Arrays (FPGA), or a combination of ASIC and FPGA.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An Integrated Circuit (IC), comprising:
a memory, to store coefficients of multiple approximation polynomials corresponding to multiple respective segments of a range of a mathematical function, each approximation polynomial approximating the mathematical function in the respective segment;
a segment locator circuit, to (i) receive an argument of the mathematical function, (ii) identify the segment in which the argument falls, (iii) identify whether the segment in which the argument falls has been merged with an adjacent segment, and (iv) select an approximation polynomial, from among the approximation polynomials, based on (a) the argument and (b) whether the segment in which the argument falls has been merged with an adjacent segment; and
a polynomial calculator circuit, to evaluate, over the argument, the approximation polynomial selected by the segment locator circuit.

2. The IC according to claim 1, wherein the segment locator circuit is to store a bitmap that marks any segment that has been merged with a respective adjacent segment, and to identify whether the segment in which the argument falls has been merged with an adjacent segment based on an output of the bitmap.

3. The IC according to claim 2, wherein, when the segment in which the argument falls has been merged with an adjacent segment, the segment locator circuit is to calculate a pointer to an approximation polynomial that corresponds to both (i) the segment in which the argument falls and (ii) the adjacent segment.

4. The IC according to claim 2, wherein the bitmap comprises a respective bit per segment indicating whether the segment has been merged with the respective adjacent segment, and wherein the segment locator circuit is to read the bit corresponding to the identified segment to determine whether the segment has been merged.

5. The IC according to claim 3, wherein, in calculating the pointer, the segment locator circuit is to select a memory location that stores the coefficients of an approximation polynomial corresponding to both the segment in which the argument falls and the adjacent segment.

6. The IC according to claim 1, wherein the approximation polynomials are first degree polynomials.

7. The IC according to claim 1, wherein the approximation polynomials are constrained to be continuous across a boundary between adjacent segments.

8. The IC according to claim 7, wherein the segment locator circuit is to enforce the constraint by selecting approximation polynomials for the adjacent segments whose values at the boundary are equal.

9. The IC according to claim 7, wherein the segment locator circuit is to enforce the constraint by selecting approximation polynomials for the adjacent segments whose values vary in a single direction across the boundary.

10. The IC according to claim 1, wherein the approximation polynomials are constrained to be monotonous across a boundary between adjacent segments.

11. The IC according to claim 1, wherein the segment locator circuit is to identify the segment in which the argument falls by comparing the argument to segment boundaries associated with the multiple respective segments.

* * * * *